United States Patent
Kling et al.

(10) Patent No.: US 12,196,866 B2
(45) Date of Patent: Jan. 14, 2025

(54) SYSTEM FOR CLOSED-LOOP GNSS SIMULATION

(71) Applicant: Northeastern University, Boston, MA (US)

(72) Inventors: Matthew T. Kling, Burlington, MA (US); Daniel Lau, Burlington, MA (US); Kenneth Lile Witham, Malden, MA (US); Pau Closas, Boston, MA (US); Gerald Mycko LaMountain, Malden, MA (US)

(73) Assignee: Northeastern University, Boston, MA (US)

( * ) Notice: Subject to any disclaimer, the term of this patent is extended or adjusted under 35 U.S.C. 154(b) by 430 days.

(21) Appl. No.: 17/662,822

(22) Filed: May 10, 2022

(65) Prior Publication Data

US 2022/0365223 A1   Nov. 17, 2022

Related U.S. Application Data

(60) Provisional application No. 63/186,924, filed on May 11, 2021.

(51) Int. Cl.
*G01S 19/26* (2010.01)
*G01S 19/03* (2010.01)
*G01S 19/37* (2010.01)
*H04W 4/021* (2018.01)
*H04W 64/00* (2009.01)

(52) U.S. Cl.
CPC .............. *G01S 19/26* (2013.01); *G01S 19/03* (2013.01); *G01S 19/37* (2013.01); *H04W 4/021* (2013.01); *H04W 64/00* (2013.01)

(58) Field of Classification Search
CPC .......... G01S 19/26; G01S 19/03; G01S 19/37; H04W 4/021; H04W 64/00
USPC ................... 455/456.1, 427, 431, 421, 404.2
See application file for complete search history.

(56) References Cited

U.S. PATENT DOCUMENTS

| | | | |
|---|---|---|---|
| 7,522,101 B2 | 4/2009 | Homiller et al. | |
| 8,854,260 B2 | 10/2014 | Boulton | |
| 9,158,001 B2 | 10/2015 | Ariel et al. | |
| 10,241,211 B2 | 3/2019 | Perdue et al. | |
| 10,507,799 B1 * | 12/2019 | Gilbert-Eyres | ......... B60R 25/32 |
| 2006/0208946 A1 | 9/2006 | Bailey et al. | |
| 2012/0007776 A1 | 1/2012 | Ariel et al. | |

(Continued)

OTHER PUBLICATIONS

Satellite Navigation—Wikipedia—downloaded from Internet Mar. 22, 2022. https://en.wikipedia.org/wiki/Satellite_navigation.

*Primary Examiner* — Nghi H Ly
(74) *Attorney, Agent, or Firm* — Hamilton, Brook, Smith & Reynolds, P.C.

(57) ABSTRACT

In an embodiment, a method monitors, within a global navigation satellite system (GNSS) limited zone, an intra-zone location of a vehicle having a GNSS receiver, the intra-zone location being within the limited zone. The method determines a simulated intra-zone location of the vehicle based on the intra-zone location monitored to calculate a likely location of the vehicle. The method calculates a global location of the vehicle based on the intra-zone location and the location of the GNSS limited zone within a global network of limited zones. The method broadcasts, from a transmitter within the GNSS limited zone, a GNSS signal representing the global location of the vehicle.

18 Claims, 6 Drawing Sheets

(56) References Cited

U.S. PATENT DOCUMENTS

2020/0393847 A1* 12/2020 Govindan ............ G05D 1/0295
2021/0256632 A1*  8/2021 Chiocco ................ G06Q 50/02
2022/0317312 A1* 10/2022 Sharma ................. H04W 4/40

* cited by examiner

SYSTEM FOR CLOSED-LOOP GNSS SIMULATION

RELATED APPLICATION

This application claims the benefit of U.S. Provisional Application No. 63/186,924, filed on May 11, 2021. The entire teachings of the above application are incorporated herein by reference.

GOVERNMENT SUPPORT

This invention was made with government support under Grant Number FA8750-18-C-0041 from Air Force Research Laboratory/RI. The government has certain rights in the invention.

BACKGROUND

Global Navigation Satellite System (GNSS) is a satellite navigation system that provides autonomous geo-spatial positioning with global coverage. Such systems transmit signals to receivers that analyze the signals to determine longitude, latitude, and/or altitude or elevation. Several GNSSs are currently deployed, including the United States' Global Positioning System (GPS), Russia's Global Navigation Satellite System (GLONASS), China's BeiDou Navigation Satellite System, and the European Union's Galileo.

SUMMARY

In areas where Global Navigation Satellite System GNSS is limited or denied, simulation can be used in lieu of a satellite signal. Current GNSS simulation approaches employ open-loop simulation to generate static positions and trajectories. In an open-loop system, the input to the system does not depend on the output of the system. In other words, the input is independent from the output. Open loop GNSS simulation approaches do not account for real-time physical target motion. Therefore, a framework to account for such real-time physical target motion is disclosed herein. A closed-loop GNSS framework is disclosed herein that allows more advanced system testing in controlled environments and offers unique applications for GNSS denied environments, as well as non-kinetic "Cyber-EW (Electronic Warfare)" effects on enemy systems.

In current systems, typically, in an indoor space, access to GNSS is denied or degraded. For such GNSS denied environments, available GNSS simulators are limited to performing open-loop simulation or simply repeating or amplifying "Live Sky" signals. Open-loop simulations are not capable of reflecting a change in target vehicle position or motion in the simulated signal. Therefore, in such open loop simulation systems, the vehicle does not register a change in its measured GNSS coordinates. GNSS repeaters produce a repeated signal is that of a fixed location where the outdoor antenna resides such that any change in vehicle position or motion is not registered in the measured GNSS coordinates.

In general, disclosed is a system and corresponding computer-implemented method provides a simulated GNSS signal within a GNSS denied environment (e.g., indoors, a tunnel, a city) that emulates behavior of "Live Sky" GNSS. Example embodiments of the present disclosure overcome the limitations of current systems by employing a closed-loop feedback system that adjusts the simulated GNSS signal in real-time so that change in vehicle position or motion is registered as a change in measured GNSS coordinates. In embodiments, a software framework for closed-loop GNSS simulation may include a modular and open system architecture for simulating GNSS signals using the closed-loop feedback of a position of a receiver of the GNSS signal (e.g., a target vehicle). The framework may include modules for determining or calculating (a) a precise position measurement of target vehicles, (b) an estimate of future target vehicle position, (c) a projection of future GNSS coordinates. The framework further generates and transmits a GNSS signal based on the above determinations and calculations. The system can be distributed on multiple processing blocks or can be centralized on a single hardware platform. A lightweight, low latency middleware based on ZeroMQ and Google® Flatbuffers enables the above system. Additionally, a field programmable gate array (FPGA) on a System-on-a-Chip (SoC) that includes a software defined radio front-end and general purpose CPUs for general computation implements highly efficient and low latency GNSS signal generation.

In an embodiment, a method, and corresponding system and non-transitory computer readable medium are configured to perform the following. The method monitors, within a global navigation satellite system (GNSS) limited zone, an intra-zone location of a vehicle having a GNSS receiver, the intra-zone location being within the limited zone. The intra-zone location is a location of the vehicle relative to and within the GNSS limited zone. The method determines a simulated intra-zone location of the vehicle based on the intra-zone location monitored to calculate a likely location of the vehicle. The method calculates a global location of the vehicle based on the intra-zone location and the location of the GNSS limited zone within a global network of limited zones. The method broadcasts, from a transmitter within the GNSS limited zone, a GNSS signal representing the global location of the vehicle.

In an embodiment, the vehicle is a drone.

In an embodiment, monitoring the intra-zone location is performed with at least one of a 3D imaging system, a radar system, and a lidar system. The method simulates the simulated intra-zone location based on the intra-zone location monitored. In an embodiment, the monitoring is performed by at least one of the imaging system, the radar system, and a lidar system calibrated to the GNSS limited zone, enabling calculating of the global location of the vehicle based on the intra-zone location of the vehicle and the location of the GNSS limited zone.

In an embodiment, determining the simulated intra-zone location of the vehicle employs operating a Kalman filter that includes covariance in position and delay parameters. The Kalman filter output provides the predicted position of where the target will be. The filter parameters, such as covariance in position, were set after assuming the delay of the system to be 700 milliseconds.

In an embodiment, the GNSS limited zone is a zone within which a GNSS satellite signal is at least partially unavailable, degraded, or inaccurate to use for guidance of the vehicle.

BRIEF DESCRIPTION OF THE DRAWINGS

The foregoing will be apparent from the following more particular description of example embodiments, as illustrated in the accompanying drawings in which like reference characters refer to the same parts throughout the different views. The drawings are not necessarily to scale, emphasis instead being placed upon illustrating embodiments.

DETAILED DESCRIPTION

A description of example embodiments follows.

Example embodiments of the disclosure apply to Global Navigation Satellite System (GNSS) signals in denied, degraded, or unreliable environments, such as indoor spaces, tunnels, or areas with interference. Example embodiments are applicable for establishing micro-GNSS coverage areas using ground stations, ground vehicles, or aerial vehicles as transmit sources.

In an embodiment, the system or a corresponding method includes:
  a) a signal source, such as a software defined radio;
  b) a position/tracking sensor(s), such as a 3D optical tracking camera, radar, lidar, or other imaging system; and
  c) a processing subsystem that runs software control methods to predict positions and generate GNSS positions of a tracked vehicle.

In the embodiment, each component of the system is connected via a communications network. The position tracking sensor measures the location and motion of a target vehicle in real-time and passes that information to the processing subsystem. The processing subsystem runs methods, such as a Kalman filter, to predict the next coordinate to simulate and, optionally, to transform the coordinate system. The output of the processing system is sent to the signal source, which converts the coordinates into a simulated GNSS signal, such as GPS L1.

As the vehicle moves within a simulation area, the GNSS signal is adjusted in real-time by the system such that the simulated GNSS signal reflects a location expected by the target vehicle, which classifies the system as "closed loop" as opposed to "open loop."

Today, many devices or systems rely heavily on GNSS signals for timely and accurate timing information and positioning information to operate. An GNSS receiver embedded on the target vehicle processes signals received from a constellation satellites and calculates precise timing and positioning information using known coordinates of satellites in space. GNSS is an enabling technology for many applications, including autonomous vehicles, high speed networked devices (e.g., cell phones), and more. However, GNSS is vulnerable to interference and or denial due to the nature of its weak signals. In most indoor environments, reception of GNSS signals is impossible, and, for the military, many locations are in GNSS degraded or denied environments. Embodiments of the system are capable of simulating GNSS signals without signals from one or more constellations of satellites that track the motion of the target vehicle and provide real-time dynamic navigation capabilities in any environment.

Applications of the disclosed system include the ability to provide pseudo-satellite GNSS coverage in degraded or denied environments to send to both aerial systems and ground-based systems. The system can be also deployed in a ground-based system in a fixed location or in a vehicle, or by an aircraft. Embodiments of the system further provide unique research and development benefits by providing advanced controlled testbeds for GNSS systems.

Figure 1:
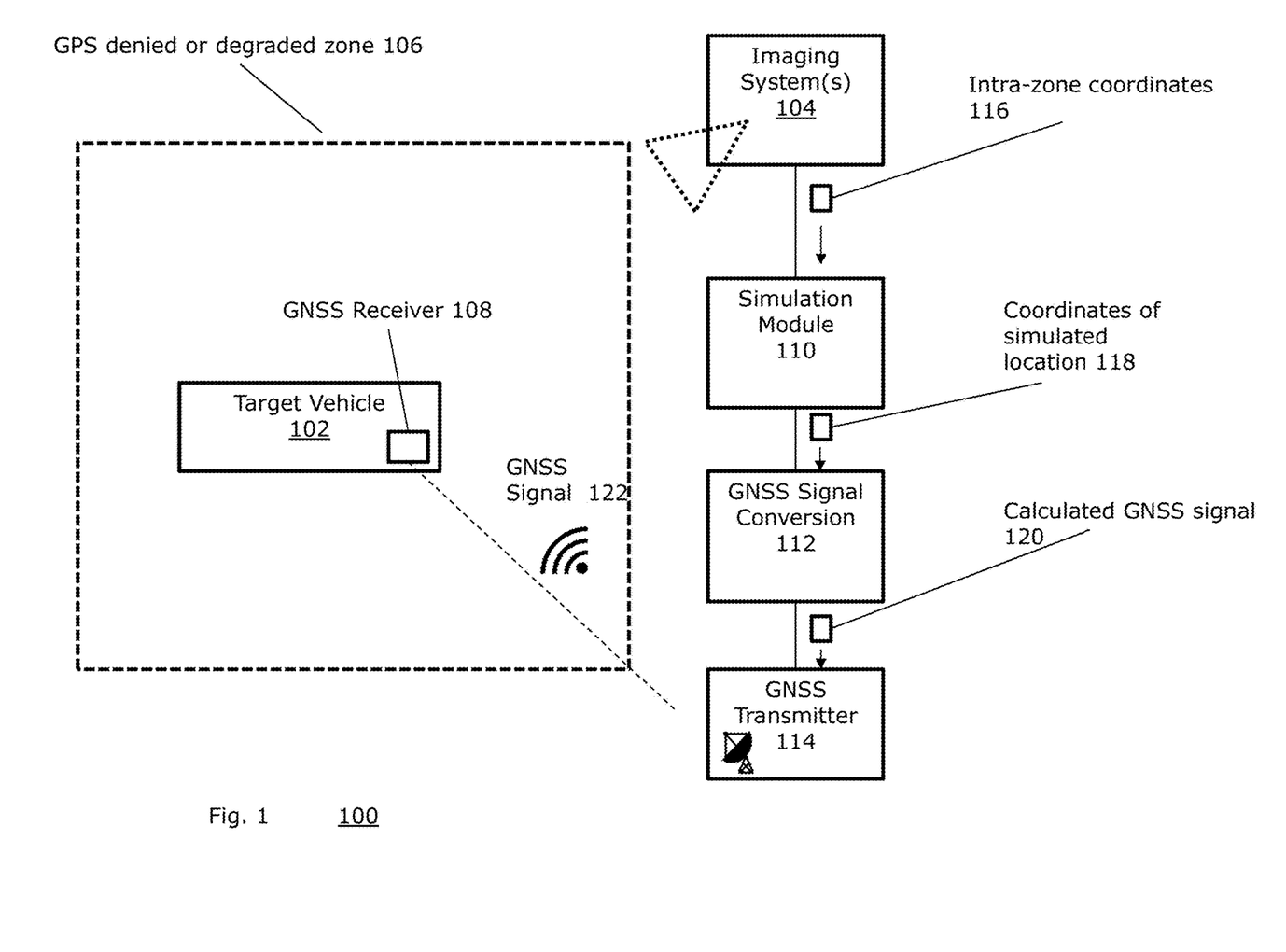
FIG. 1 is a diagram illustrating an embodiment of the present disclosure.

FIG. 1 is a diagram 100 illustrating an embodiment of the present disclosure. A target vehicle 102 includes a GNSS receiver 108 within a GNSS denied or degraded zone 106. The GNSS receiver 108 is a standard GNSS receiver that is not modified, such that any vehicle within the GNSS denied or degraded zone 106 can work with the present system. The GPS denied or degraded zone 106 is an area where the GNSS signal is denied, degraded, or unreliable either in partial locations within the zone or in the zone entirely. The GNSS denied or degraded zone 106 can be a result of the zone being indoors, underground, in a tunnel, subject to interference, topographic interference, weather interference, radio-frequency (RF) interference, or other factors. In the GNSS denied or degraded zone 106, the target vehicle's GNSS receiver 108 does not receive or does not reliably receive GNSS signals from satellites, and therefore cannot determine its position from a GNSS system such as GPS. Therefore, Applicant's system and corresponding method can be employed to provide a pseudo GNSS signal 122 to the GNSS receiver 108 equivalent to the target vehicle's 102 position.

An imaging system 104 is configured to monitor the GPS denied or degraded zone 106. The imagine system 104 can be a 3D imaging system, a radar system, a lidar system, other imaging system, or combination of the above. The imaging system(s) 104 are configured to determine locations of the target vehicle 102 within the GPS denied or degraded zone 106 over multiple time steps. The imaging system(s) 104 output intra-zone coordinates 116 of the target vehicle 102, which can include multiple coordinates over multiple time steps. A simulation module 110, based on the intra-zone coordinates, predicts a path of future coordinates of the target vehicle 102. The simulation module 110 further stabilizes the position of the target vehicle 102. The simulation module 110 outputs coordinates of simulated location 118, which can include multiple coordinates associated with predicted timestamps that the target vehicle 102 will be at those coordinates.

A GNSS signal conversion module 112 analyzes the coordinates 118 and generates a calculated GNSS signal 120. The GNSS signal conversion module 112 analyzes the coordinates 118 and distances of each coordinate 118 to a GNSS transmitter 114 located within range of transmitting to the GPS denied or degraded zone 106. The GNSS signal conversion 112 converts the spatial coordinates 118 to a calculated GNSS signal 120. Such a conversion takes many factors into account, including the distance between the spatial coordinates 118, the location of the GPS denied or degraded zone 106, the location of the GNSS transmitter 114, the delay of generating such a signal, the delay of transmitting the signal, and propagation delay of sending a signal. Further, interpretation of the GNSS signals are dependent upon the time that they are received by the GNSS receiver 108. Therefore, the calculated GNSS signal 120 needs to be calculated precisely so that it is received at the correct time and location. Once the GNSS signal 120 is calculated, a GNSS transmitter 114 sends the signal to the GNSS receiver 108 of the target vehicle 102, which interprets the signals as if they were a "live sky" signal from a satellite. The target vehicle 102 can then navigate based on the signal, where the imaging system 104 continues to monitor the target vehicle 102. The system continues running iteratively to continue to provide a GNSS signal to the target vehicle 102.

In general, the system provides a simulated GNSS signal within a GNSS denied space (e.g., indoors) that emulates the behavior of "Live Sky" GNSS. Typically, in an indoor space, access to GNSS is denied or degraded, and available GNSS simulators are limited to open-loop simulation or acting as repeaters for "Live Sky" signals. In the case of open-loop simulation, a change in target vehicle position or motion is not reflected in the simulated signal, so the vehicle does not register a change in its measured GNSS coordinates. In the case of GNSS repeaters, the repeated signal is that of a fixed location where the outdoor antenna resides, and, again, any change in vehicle position or motion is not registered in the measured GNSS coordinates. An example embodiment of the invention overcomes these limitations by created a closed-loop feedback system that adjusts the simulated GNSS signal in real-time so that change in vehicle position or motion is registered as a change in measured GNSS coordinates.

Figure 2:
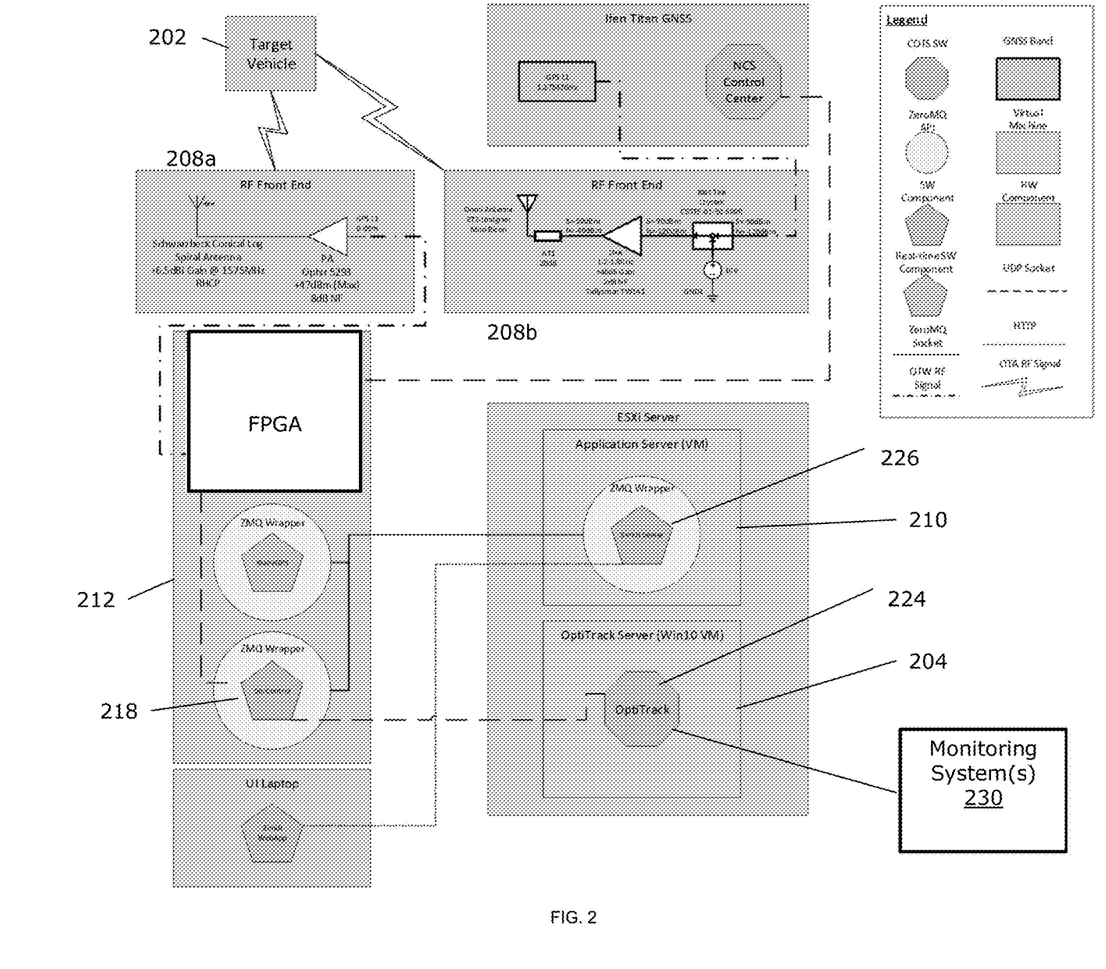
FIG. 2 is a diagram illustrating an example embodiment of the GNSS simulation system including example hardware and software implementation options.

FIG. 2 is a diagram 200 illustrating an example embodiment of the GNSS simulation system including example hardware and software implementation options. The example GNSS simulation system includes seven blocks, which include hardware and software components.

In this particular embodiment, an ESXi server 214 runs two virtual machines 204 and 210 that host the SdrControl module 218 and SimUI Server 226 application on one VM 210, and the OptiTrack module 224, or determination module, on the other VM 204. The OptiTrack module 224 determines coordinates of the target vehicle based on data received from a monitoring system 230. The SdrControl module 218 runs the main simulation methods by translating received positional data from the OptiTrack server 204 in the form of X, Y, Z coordinates into Earth Center-Earth Fixed (ECEF) coordinates. The SdrControl module 218, or calculation module, further calculates a next point to simulate to control the motion of a target vehicle 202. The SdrControl application 218 then sends the relevant SDR control commands to the RF front ends 208a-b, or broadcast module(s).

An FGPA, such as a Xilinx ZCU102 SDR/CPU, 212 hosts the FastGpsSim library, implemented in FPGA/Firmware for low latency and extremely fast computation, that controls the SDR transmitter to transmit a simulated GNSS signal. The ZCU102 SDR/CPU receives commands from the SdrControl application 218. The RF Front End 218a-b interfaced with or integrated into for the ZCU102 amplifies the SDR transmission output to the appropriate level to transmit via a directional conical log spiral antenna.

The Ifen Titan GNSS hardware module 228 hosts GNSS simulations that act as the "live-sky" GNSS signals. The RF Front End 208a-b for the Ifen Titan GNSS hardware module 228 amplifies and conditions the signal for over the air (OTA) transmission via an omni-directional antenna. A person having ordinary skill in the art can recognize that these modules are interchangeable with other GNSS simulators and RF front ends that emulate "live sky" signals.

A UI Laptop 216 may be optionally employed to display the front-end of the UI application 222 (e.g., a SimUI WebApp) to allow a user to control the GNSS simulation system.

A target vehicle 202 is used to test GNSS simulation algorithms for real-time motion and the ability of the system to track its location accurately. The target vehicle 202 can be an autonomous, semi-autonomous vehicle. The target vehicle 202 can be ground-based or aerial.

Software and firmware may be written in computer programming languages including, but not limited to, Python, C/C++, HDL (VHDL), and JavaScript/React. A modular framework may be employed for closed-loop GNSS simulation, which enables multiple instantiations and plug-and-play modules. Low latency, high speed middleware and computation/algorithms may be employed for processing GNSS signals. A user interface may be provided for target vehicle visualization. A person having ordinary skill in the art can recognize that the embodiments of the disclosure are not limited to the above specific hardware packages. The above packages can be substituted by other hardware or software combinations. The specific packages are described as one possible implementation, but modular substitutions can be made to the specific hardware.

Embodiments of this disclosure provide an ability to manage a simulated GNSS signal in real-time such that a GNSS receiver in motion perceives that it is moving, even without receiving a satellite provided GNSS signal. The system forms a closed-loop system that records highly accurate position measurements of a target vehicle in real-time, and those positions are used to update the simulated GNSS signals. A method similar to a Kalman-filter may be employed to provide future position estimates to guide the vehicle on a pilot-based or pre-programmed trajectory. A person having ordinary skill in the art can recognize that a Kalman filter uses a series of measurements observed over time, such as positions, statistical noise, etc., and produces estimates of unknown variables such as a prediction of the measurements. The result is that the target vehicle can navigate a GNSS denied or degraded area using the simulated GNSS signals, just as it would with live sky signals. Other known attempts at solving this problem have adopted open loop or repeated based methods of real-time GNSS signal generation/manipulation.

Figure 3:
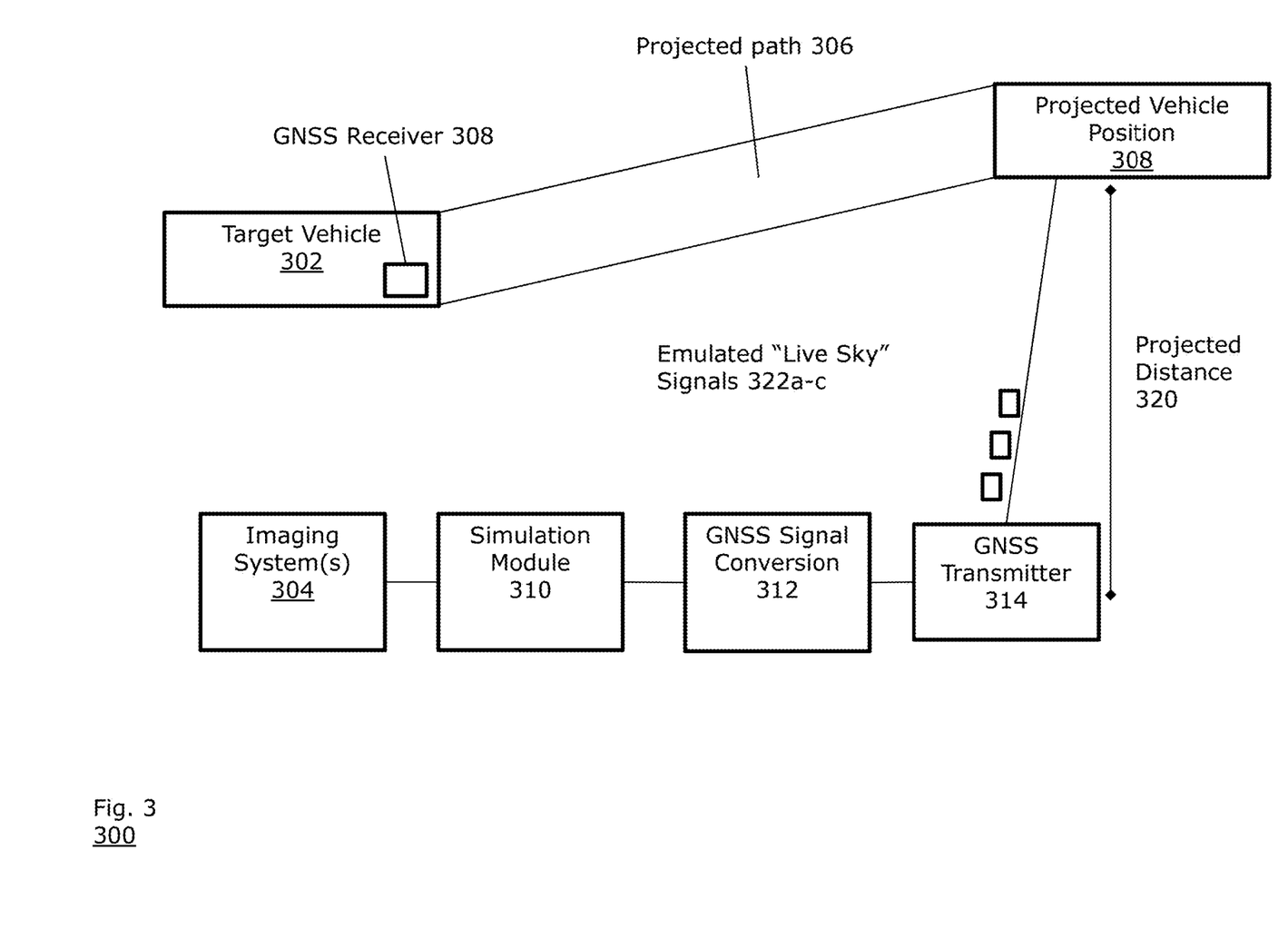
FIG. 3 is a diagram illustrating an example embodiment of the present disclosure.

FIG. 3 is a diagram 300 illustrating an example embodiment of the present disclosure. A target vehicle 302 includes a GNSS receiver 308 within a GNSS denied or degraded zone or area. An imaging system 304 monitors the position of the target vehicle 302 over time. A simulation module 310 calculates a projected path 306 and projected vehicle position 308 of the target vehicle based on its past movement. The projected vehicle position 308 represents a simulated position of the target vehicle 302 at the time it receives the GNSS signals 322a-c.

At a high level, GNSS signals include a highly accurate timestamp. A GNSS receiver receives signals from three of a regional or worldwide network of satellites, and determines its own location by calculating the delay from its own timestamp and the timestamps in each message, as well as the known position of each satellite. Therefore, the GNSS signal conversion module 312 determines emulated signals to send to the target vehicle 302 including emulating the satellites they originate from, the timestamp the message they contain, and the time they are to be transmitted. The projected distance 320 (e.g., propagation delay) and the time it takes to calculate the position and signal (e.g., calculation delay) can also be a factor in determining the signals 322a-c to be sent. Once determined, the GNSS transmitter 314 transmits the signal to the target vehicle 302.

A calculation performed to account for the overall delay of the system calculation includes delay from sending network packets between components from 304, 310, 312, and 314. It includes the delay from calculating the next position to be simulated in 310. It further takes into account the rate at which binary data is consumed at the transmitter 314. The delay values were measured by averaging samples using timing mechanisms implemented directly in the software. Once the delay values were calculated, the buffer size was adjusted to reflect the average delay while taking into account the rate at which the transmitter 314 consumes samples.

Figure 4:
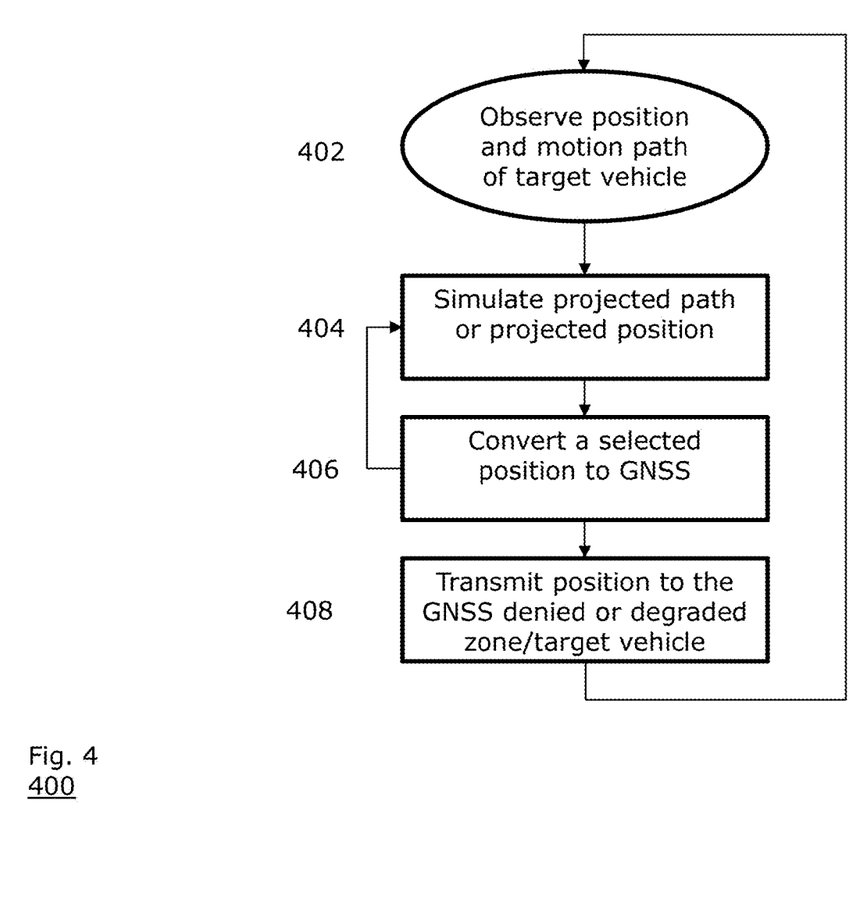
FIG. 4 is a flow diagram illustrating an example embodiment of the present disclosure.

FIG. 4 is a flow diagram 400 illustrating an example embodiment of the present disclosure. A method begins by observing position and a motion path of a target vehicle on a continuing basis (402). The method then simulates a projected path or projected position based on the observed position and motion path (404). The method then converts the positions to a GNSS signal (406). The converted GNSS signal (406) is used to further simulate projected paths or projected positions (404), but also used to transmit the position to the target vehicle in the GNSS denied or degraded zone (408).

Embodiments of the present disclosure provide several advantages. In a normal satellite-based navigation system (e.g., GNSS), a receiver measures path delays between different signals having highly accurate timestamps (i.e., from different satellites) to estimate its own coordinates on Earth based on existing knowledge of satellite positions. In an embodiment of the invention, the GNSS signal source is located in close proximity to the receiver so the path delays do not vary in the same way a "Live Sky" GNSS system has large propagation delays. To compensate for this, an embodiment of the software-defined radio based implementation measures the position of a target vehicle and modifies the signal such that the path delays measured at the receiver vary according to the desired motion, but instead of being due to the propagation delays of a satellite to the receiver, are due to intentionally calculated delays in transmission.

In an embodiment, the present disclosure provides an advantage for GNSS-based vehicles because robust indoor testing is now possible. Without the system of the present disclosure, testing would have previously required outdoor testing with live satellite signals, or using the inferior closed-loop or repeater based technologies.

For commercial applications, an embodiment of the system does not require any device hardware upgrades or modifications to the vehicle because the broadcast system is configured to work with the existing GNSS receiver.

Embodiments of the system include many example uses. A first use is a lab testbed for GNSS research and development. A second use is air-to-air systems for GNSS simulation (Counter-UAS, GNSS Denied Relay/Psuedo-satellite). A third use is air-to-ground systems for GNSS simulation (Counter-UGV, GNSS Denied Relay). A fourth use is ability to generate dynamic GNSS signals in an indoor space or to set-up micro-GNSS coverage areas in denied environments. A fifth use is indoor drone/robotic navigation using closed-loop GNSS simulation (warehouses, factories, etc.). A sixth use is military scenarios such as pseudo-satellite application for a GNSS denied environment. A seventh use is military scenarios for Counter-PNT systems (deny or manipulate GNSS of adversary system). An eighth use is test equipment for developing GNSS-based systems (lab testbeds/advanced simulators).

Figure 5:
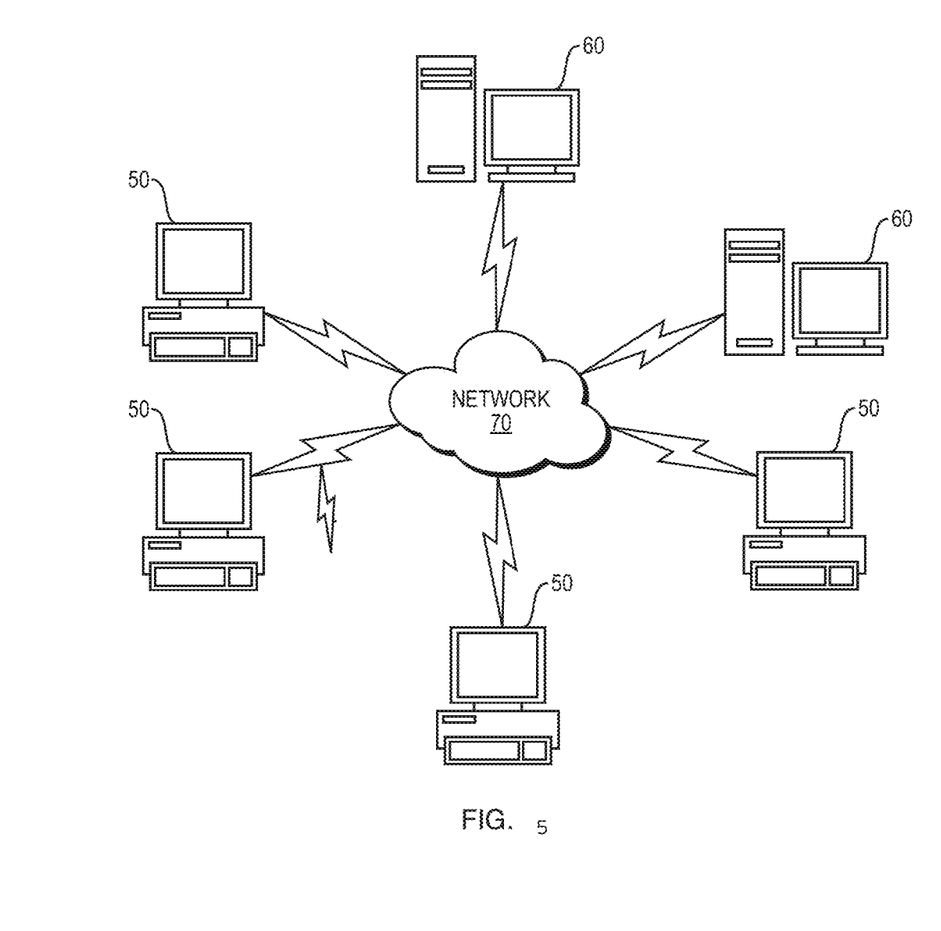
FIG. 5 illustrates a computer network or similar digital processing environment in which embodiments of the present invention may be implemented.

FIG. 5 illustrates a computer network or similar digital processing environment in which embodiments of the present invention may be implemented.

Client computer(s)/devices 50 and server computer(s) 60 provide processing, storage, and input/output devices executing application programs and the like. The client computer(s)/devices 50 can also be linked through communications network 70 to other computing devices, including other client devices/processes 50 and server computer(s) 60. The communications network 70 can be part of a remote access network, a global network (e.g., the Internet), a worldwide collection of computers, local area or wide area networks, and gateways that currently use respective protocols (TCP/IP, Bluetooth®, etc.) to communicate with one another. Other electronic device/computer network architectures are suitable.

Figure 6:
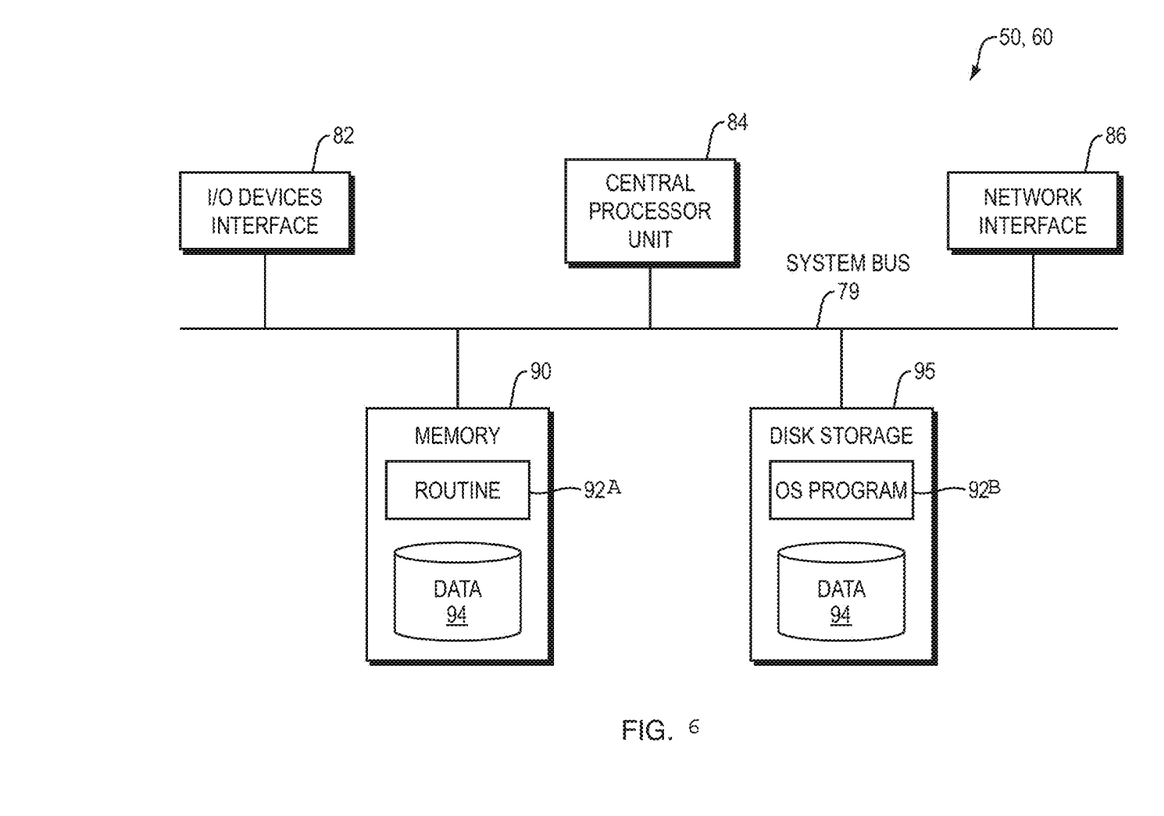
FIG. 6 is a diagram of an example internal structure of a computer (e.g., client processor/device or server computers) in the computer system of FIG. 5.

FIG. 6 is a diagram of an example internal structure of a computer (e.g., client processor/device 50 or server computers 60) in the computer system of FIG. 5. Each computer 50, 60 contains a system bus 79, where a bus is a set of hardware lines used for data transfer among the components of a computer or processing system. The system bus 79 is essentially a shared conduit that connects different elements of a computer system (e.g., processor, disk storage, memory, input/output ports, network ports, etc.) that enables the transfer of information between the elements. Attached to the system bus 79 is an I/O device interface 82 for connecting various input and output devices (e.g., keyboard, mouse, displays, printers, speakers, etc.) to the computer 50, 60. A network interface 86 allows the computer to connect to various other devices attached to a network (e.g., network 70 of FIG. 5). Memory 90 provides volatile storage for computer software instructions 92 and data 94 used to implement an embodiment of the present invention (e.g., structure generation module, computation module, and combination module code detailed above). Disk storage 95 provides non-volatile storage for computer software instructions 92 and data 94 used to implement an embodiment of the present invention. A central processor unit 84 is also attached to the system bus 79 and provides for the execution of computer instructions.

In one embodiment, the processor routines 92 and data 94 are a computer program product (generally referenced 92), including a non-transitory computer-readable medium (e.g., a removable storage medium such as one or more DVD-ROM's, CD-ROM's, diskettes, tapes, etc.) that provides at least a portion of the software instructions for the invention system. The computer program product 92 can be installed by any suitable software installation procedure, as is well known in the art. In another embodiment, at least a portion of the software instructions may also be downloaded over a cable communication and/or wireless connection. In other embodiments, the invention programs are a computer program propagated signal product embodied on a propagated signal on a propagation medium (e.g., a radio wave, an infrared wave, a laser wave, a sound wave, or an electrical wave propagated over a global network such as the Internet, or other network(s)). Such carrier medium or signals may be employed to provide at least a portion of the software instructions for the present invention routines/program 92.

While example embodiments have been particularly shown and described, it will be understood by those skilled in the art that various changes in form and details may be made therein without departing from the scope of the embodiments encompassed or contemplated herein.

What is claimed is:

1. A method comprising:
monitoring, within a global navigation satellite system (GNSS) limited zone, an intra-zone location of a vehicle having a GNSS receiver, the intra-zone location being within the limited zone;
determining a simulated intra-zone location of the vehicle based on the intra-zone location monitored to calculate a likely location of the vehicle;
calculating a global location of the vehicle based on the intra-zone location and the location of the GNSS limited zone within a global network of limited zones; and
broadcasting, from a transmitter within the GNSS limited zone, a GNSS signal representing the global location of the vehicle.

2. The method of claim 1, wherein the vehicle is a drone.

3. The method of claim 1, wherein the monitoring the intra-zone location is performed with at least one of a 3D imaging system, a radar system, and a lidar system, and further comprising:
simulating the simulated intra-zone location based on the intra-zone location monitored.

4. The method of claim 3, wherein the monitoring is performed by at least one of the imaging system, the radar system, and a lidar system calibrated to the GNSS limited zone, enabling calculating of the global location of the vehicle based on the intra-zone location of the vehicle and the location of the GNSS limited zone.

5. The method of claim 1, wherein determining the simulated intra-zone location of the vehicle employs operating a Kalman filter that includes covariance in position and delay parameters.

6. The method of claim 1, wherein the GNSS limited zone is a zone within which a GNSS satellite signal is at least partially unavailable, degraded, or inaccurate to use for guidance of the vehicle.

7. A system comprising:
a processor; and
a memory with computer code instructions stored thereon, the processor and the memory, with the computer code instructions, being configured to cause the system to:
monitor, within a global navigation satellite system (GNSS) limited zone, an intra-zone location of a vehicle having a GNSS receiver, the intra-zone location being within the limited zone;
determine a simulated intra-zone location of the vehicle based on the intra-zone location monitored to calculate a likely location of the vehicle;
calculate a global location of the vehicle based on the intra-zone location and the location of the GNSS limited zone within a global network of limited zones; and
broadcast, from a transmitter within the GNSS limited zone, a GNSS signal representing the global location of the vehicle.

8. The system of claim 7, wherein the vehicle is a drone.

9. The system of claim 7, wherein the monitoring the intra-zone location is performed with at least one of a 3D imaging system, a radar system, and a lidar system, and further comprising:
simulating the simulated intra-zone location based on the intra-zone location monitored.

10. The system of claim 9, wherein the monitoring is performed by at least one of the imaging system, the radar system, and a lidar system calibrated to the GNSS limited zone, enabling calculating of the global location of the vehicle based on the intra-zone location of the vehicle and the location of the GNSS limited zone.

11. The system of claim 7, wherein determining the simulated intra-zone location of the vehicle employs operating a Kalman filter that includes covariance in position and delay parameters.

12. The system of claim 7, wherein the GNSS limited zone is a zone within which a GNSS satellite signal is at least partially unavailable, degraded, or inaccurate to use for guidance of the vehicle.

13. A non-transitory computer-readable medium configured to store instructions for performing an intelligent targeted search, the instructions, when loaded and executed by a processor, cause the processor to:
monitor, within a global navigation satellite system (GNSS) limited zone, an intra-zone location of a vehicle having a GNSS receiver, the intra-zone location being within the limited zone;
determine a simulated intra-zone location of the vehicle based on the intra-zone location monitored to calculate a likely location of the vehicle;
calculate a global location of the vehicle based on the intra-zone location and the location of the GNSS limited zone within a global network of limited zones; and
broadcast, from a transmitter within the GNSS limited zone, a GNSS signal representing the global location of the vehicle.

14. The non-transitory computer-readable medium of claim 13, wherein the vehicle is a drone.

15. The non-transitory computer-readable medium of claim 13, wherein the monitoring the intra-zone location is performed with at least one of a 3D imaging system, a radar system, and a lidar system, and further comprising:
simulating the simulated intra-zone location based on the intra-zone location monitored.

16. The non-transitory computer-readable medium of claim 15, wherein the monitoring is performed by at least one of the imaging system, the radar system, and a lidar system calibrated to the GNSS limited zone, enabling calculating of the global location of the vehicle based on the intra-zone location of the vehicle and the location of the GNSS limited zone.

17. The non-transitory computer-readable medium of claim 13, wherein determining the simulated intra-zone location of the vehicle employs operating a Kalman filter that includes covariance in position and delay parameters.

18. The non-transitory computer-readable medium of claim 13, wherein the GNSS limited zone is a zone within which a GNSS satellite signal is at least partially unavailable, degraded, or inaccurate to use for guidance of the vehicle.

* * * * *